United States Patent [19]

Gray et al.

[11] Patent Number: 5,787,354
[45] Date of Patent: Jul. 28, 1998

[54] METHOD AND APPARATUS FOR LOCATING A RADIOTELEPHONE WITHIN A CELLULAR SYSTEM

[75] Inventors: Calvin Boyd Gray, Alphretta; Robert G. Zicker, Roswell, both of Ga.

[73] Assignee: GTE Mobile Communications Service Corporation, Atlanta, Ga.

[21] Appl. No.: 415,825

[22] Filed: Apr. 3, 1995

Related U.S. Application Data

[63] Continuation-in-part of Ser. No. 201,445, Feb. 24, 1994, Pat. No. 5,594,782.

[51] Int. Cl.⁶ .................................................. H04Q 7/22
[52] U.S. Cl. .................... 455/456; 455/435; 455/426; 455/552
[58] Field of Search .......................... 379/58, 59, 60; 455/33.1, 33.2, 56.1, 54.1, 403, 422, 426, 550, 552, 434, 432, 435, 445, 461, 456

[56] References Cited

U.S. PATENT DOCUMENTS

| | | | |
|---|---|---|---|
| 4,700,374 | 10/1987 | Bini | 379/60 |
| 4,843,622 | 6/1989 | Yotsumtani et al. | 379/59 |
| 4,852,148 | 7/1989 | Shibata et al. | 379/59 |
| 4,989,230 | 1/1991 | Gillig et al. | 379/59 |
| 5,043,736 | 8/1991 | Darnell et al. | 342/357 |
| 5,212,822 | 5/1993 | Fukumine et al. | 455/33.1 |
| 5,218,716 | 6/1993 | Comroe et al. | 455/33.4 |
| 5,235,632 | 8/1993 | Raith | 379/59 |
| 5,260,988 | 11/1993 | Schellinger et al. | 379/59 |
| 5,291,543 | 3/1994 | Freese et al. | 379/59 |
| 5,295,180 | 3/1994 | Vendetti et al. | 379/59 |
| 5,301,353 | 4/1994 | Borras et al. | 455/9 |
| 5,303,297 | 4/1994 | Hillis | 379/63 |
| 5,329,576 | 7/1994 | Handforth | 379/59 |
| 5,345,498 | 9/1994 | Mauger | 379/58 |
| 5,353,331 | 10/1994 | Emery et al. | 379/58 |
| 5,394,158 | 2/1995 | Chia | 342/457 |
| 5,400,392 | 3/1995 | Nagashima et al. | 379/60 |
| 5,548,816 | 8/1996 | DeVaney | 379/59 X |
| 5,594,782 | 1/1997 | Zicker et al. | 379/63 |

OTHER PUBLICATIONS

EIA/TIA Standard, Electronic Industries Association Engineering Dept., Sep. 1989.

*Primary Examiner*—Dwayne D. Bost
*Assistant Examiner*—William G. Trost
*Attorney, Agent, or Firm*—Leonard C. Suchyta

[57] ABSTRACT

A cellular telecommunication system (CTS) is provided that supports the operation of a radiotelephone (RT) in cellular and cordless modes. The CTS includes operating features that are dependent upon the intrasystem location of the RT. The CTS includes a mobile telephone switching office, a plurality of land stations, a plurality of cells, a plurality of zones defined by one or more cells, a plurality of local regions defined by one or more cells, and a cordless base station located within one of the cells. The land stations transmit zone identification (ZNID) signals and local region identification (LRID) signals, which the RT receives and compares to one or more ZNID codes and one or more LRID codes, respectively. The RT displays its intrasystem billing zone location and initiates communication with the cordless base station in response to the received ZNID and LRID signals, respectively.

10 Claims, 7 Drawing Sheets

METHOD AND APPARATUS FOR LOCATING A RADIOTELEPHONE WITHIN A CELLULAR SYSTEM

RELATED APPLICATION

The present patent application is a Continuation-In-Part of U.S. Pat. No. 5,594,782, "Multiple Mode Personal Wireless Communications System," by Robert G. Zicker, et al., Ser. No. 08/201,445, filed Feb. 24, 1994.

FIELD OF THE INVENTION

The present invention relates generally to portable telephones. More particularly, the present invention relates to communication systems that locate a cellular telephone within a mobile cellular telephone system.

BACKGROUND OF THE INVENTION

Typically, a cellular telecommunication system (CTS) is identified by a unique system identification (SID). A CTS contains a number of cells defined by the transmit/receive range of a corresponding number of land stations. Within a CTS, at least one mobile telephone switching office (MTSO) functions as a link between the land stations and the standard public switched telecommunications network (PSTN). A typical CTS operates on an assigned set of transmitting frequencies, with individual cells utilizing distinct subsets of those frequencies.

It is often desirable for a CTS to determine the geographic location of individual handsets within the CTS. For example, it may be useful to determine which cell, group of cells, or system a particular handset is located in. The location information may be required by the CTS for different reasons. For example, it is common in the cellular telephony art to identify whether a handset is located within its "home" system or "roaming" within a nonsubscribing system.

In the above-listed related application, a locating process dependent upon the CTS operating frequencies is described. This process locates a handset in terms of particular cell areas by the handset detecting the radio frequencies transmitted by the corresponding land stations. However, this locating process appears to pose problems when operating frequencies are changed or reassigned within the CTS, or if cells associated with a particular land station are divided. When operating frequencies are altered, or cells are divided, a frequency-dependent locating process must be correspondingly altered. This may require the reprogramming of hundreds of handsets, MTSOs, or other CTS components. In addition to the time and effort involved in reprogramming components in response to operating frequency changes, there may be a programming delay between the actual frequency changes and the reprogramming of the components, during which the location process might possibly be erroneous or inoperative. Therefore, a need exists for a locating process that is independent of specific operating frequencies.

As another example, many locating methods are designed only for intersystem use, i.e., they are designed to receive and analyze the SIDs associated with different cellular systems. Such locating processes are inherently limited to manipulating SID information, which yields a very broad indication of the location of a handset. Thus, there is also a need for a locating system that is not limited to processing SID information, such that the intrasystem handset location can be determined.

SUMMARY OF THE INVENTION

Accordingly, it is an advantage of the present invention that an improved method of operating a radiotelephone (RT) within a cellular telecommunication system (CTS) having a unique system identification (SID) is provided.

Another advantage of the present invention is that an RT is provided that identifies its location within a CTS having a unique SID.

A further advantage of the present invention is that a CTS is provided that identifies and processes the intrasystem location of an RT operating within the system.

Another advantage of the present invention is that an improved RT and method of initiating the cordless operation of the RT within a dual-mode telecommunication system is provided.

The above and other advantages of the present invention can be carried out in one form by a method of operating an RT within a CTS. The method involves receiving an intrasystem location identification signal at the RT and performing an intrasystem location dependent operation at the RT in response to the received intrasystem location identification signal.

The above and other advantages of the present invention can also be carried out in another embodiment by an RT that includes a receiver for receiving an intrasystem location identification signal, a data storage element for storing one or more location identification codes, and a control circuit having a means for comparing the intrasystem location identification signal with the location identification codes.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

In the following description of the preferred embodiment, certain items may be operatively identical to other items. This description distinguishes such items from their counterparts by the use of lower case alphabetic characters that are appended to a common reference number. When an alphabetic character is omitted, the description refers to any one of such items and their counterparts individually or to all of them collectively.

Figure 1:
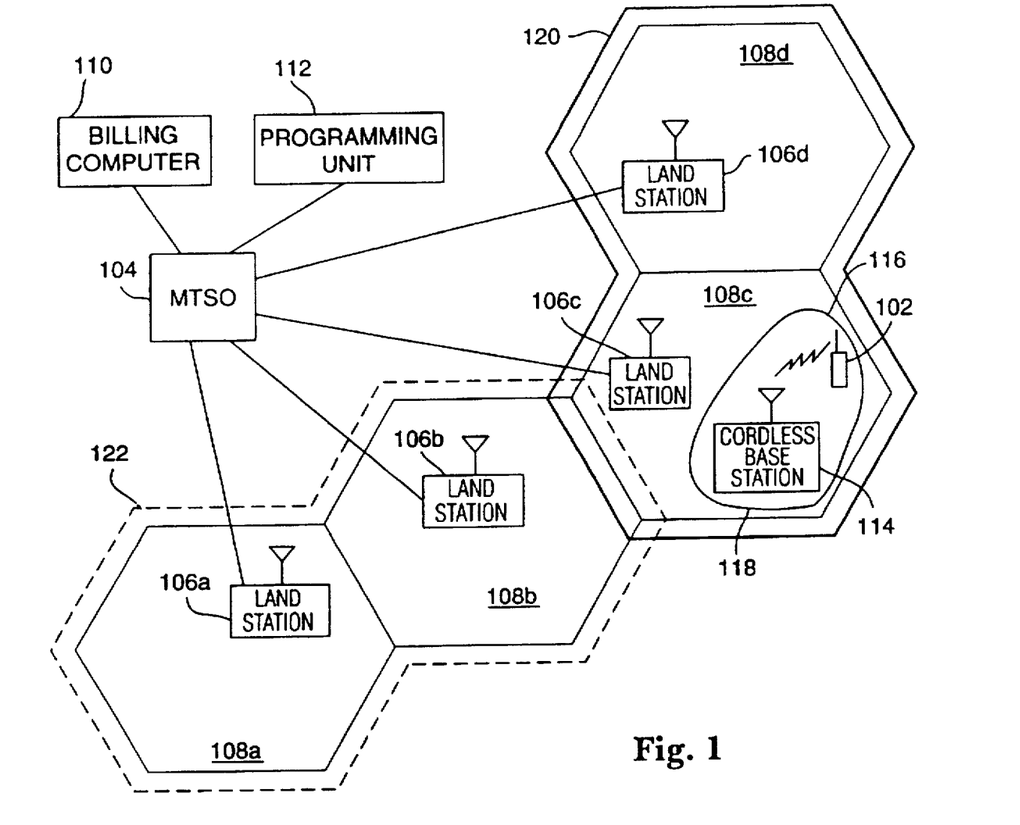
FIG. 1 shows the operational environment for a radiotelephone (RT) that functions in either a cellular mode or a cordless mode.

Referring to FIG. 1, the operational environment for a radiotelephone (RT) 102 according to the present invention is illustrated. In the preferred embodiment, RT 102 is configured to operate in both cellular and cordless modes. Depending upon the location of RT 102 within a cellular telecommunication system (CTS) 100, RT 102 functions in one of the two operational modes.

CTS 100 has a unique system identification (SID) assigned to it. Although nothing prevents CTS 100 from taking part in intersystem location analysis processes, the following description focuses on intrasystem location analysis within one CTS 100. Although only one mobile telephone switching office (MTSO) 104 is shown in FIG. 1, CTS 100 may include any number of MTSOs depending upon the size and configuration of CTS 100. MTSO 104 provides a transmission link between a public switched telecommunications network (PSTN) (not shown) and a plurality of land stations 106 located throughout CTS 100. Land stations 106 have transmit/receive ranges generally defined by a corresponding number of cells 108. MTSO 104 may include or be in data communication with a billing computer 110 that records and processes data regarding the use of RT 102. In addition, MTSO 104 may include or be in data communication with a programming unit 112 that is utilized to program elements within CTS 100 with various operating parameters.

According to the preferred embodiment of the present invention, RT 102 is also configured to interact with a cordless base station 114. Cordless base station 114 also connects to the PSTN (not shown). As will be described in more detail below, cordless base station 114 has a transmit/receive range substantially smaller than each of land stations 106. Physically, cordless base station 114 is located within the operating boundary of CTS 100 to allow RT 102 to function as a dual-mode device. When RT 102 is operating near cordless base station 114, it functions in a cordless mode. Otherwise, it functions in a cellular mode.

With continued reference to FIG. 1, the transmit/receive ranges associated with a dual-mode telecommunication system are depicted. Within the operating range of CTS 100 is a cell boundary 116 corresponding to the transmit/receive range of land station 106c. Although only four cells 108 are depicted in FIG. 1, CTS 100 may include any number of cells. Within cell boundary 116 is a cordless boundary 118 corresponding to the transmit/receive range of cordless base station 114. Cordless boundary 118 is substantially smaller than cell boundary 116, and typically encompasses an area approximately the size of a home or an office. Thus, when RT 102 is located within cordless boundary 118, it operates as a cordless telephone. Otherwise, when RT 102 is located outside of cordless boundary 118, it operates as a cellular telephone.

Figure 2:
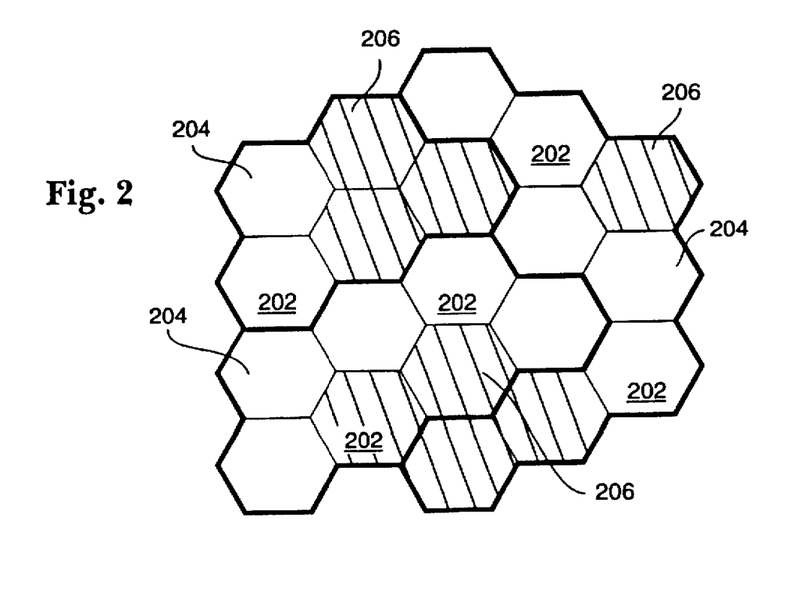
FIG. 2 is a schematic layout of a cellular telecommunication system (CTS) that is partitioned into a plurality of zones and a plurality of local regions.

The preferred embodiment of the present invention is directed to the determination of the location of RT 102 in terms of "zones" and "local regions." FIG. 2 is a schematic layout of a CTS showing a plurality of zones 204 and a plurality of local regions 206 overlaid upon a plurality of cells 202. For the sake of clarity, zones 204 and local regions 206 are shown as various combinations of cells 202. However, zones 204 and local regions 206 may follow different geographical lines. In addition, zones 204 and local regions 206 may or may not overlap or share common geographic areas.

Generally, land stations 106 transmit zone identification signals (ZNID signals) and local region identification signals (LRID signals) in addition to other conventional cellular signals throughout their corresponding cells 108 (see FIG. 1). The ZNID and LRID signals may be characterized as intrasystem location identifying signals because they relate to specific zone and local region locations, respectively, within a single CTS. RT 102 receives the signals and compares them to zone identification codes (ZNID codes) and local region identification codes (LRID codes) stored in memory. RT 102 processes the signals and codes to determine its billing zone location and whether to attempt to contact cordless base station 114.

As will be described in more detail below, the preferred embodiment utilizes zones 204 as a location indicator for RT 102. According to one aspect of the present invention, zones 204 represent different billing rates for individual cellular subscribers. According to another aspect of the invention, local regions 206 are utilized by RT 102 to determine whether RT 102 is in the vicinity of an assigned cordless base station 114. For example, as shown in FIG. 1, if RT 102 is located within a local region 120, it will attempt to establish communication with cordless base station 114.

Figure 3:
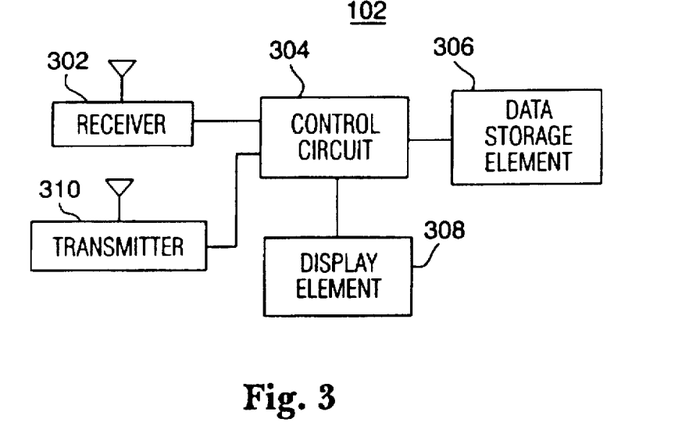
FIG. 3 shows a block diagram of an RT according to the present invention.

With reference now to FIG. 3, RT 102 is depicted in block diagram form. RT 102 is configured to perform a zone location display process (DISP process) 600 and a cordless base acknowledge process (ACK process) 700. Both of these processes are preferred aspects of the present invention, and will be described in more detail below. RT 102 is compatible with standard cellular operating systems as described in EIA/TIA Standard 553. For clarity, standard cellular operating elements are not shown in FIG. 3.

RT 102 includes a receiver 302 capable of receiving the ZNID and LRID signals. Preferably, receiver 302 is the same receiver used by RT 102 for standard control and voice communications. Receiver 302 is connected to a control circuit 304 that functions to control the various operations of RT 102. Control circuit 304 may be a conventional microprocessor circuit well known in the cellular telephony art. Control circuit 304 is, among other things, a comparator circuit that compares the received ZNID and LRID signals with a number of ZNID and LRID codes stored in a data storage element 306. According to the preferred embodiment, data storage element 306 may store up to eight ZNID codes and eight LRID codes. Data storage element 306 is also connected to control circuit 304.

A display element 308 is also connected to control circuit 304. Preferably, display element 308 is a common cellular telephone display panel that includes display features well known in the art. Display element 308 includes a first zone indicator (not shown) and a second zone indicator (not shown), both of which are integral to display element 308. Although the preferred embodiment of RT 102 utilizes the first and second zone indicators as first and second billing rate indicators, respectively, the zone indicators need not be dedicated to displaying billing rate information. As such, the zone indicators may also convey additional information. Control circuit 304 causes either the first or second billing rate indicator to be displayed at display element 308, depending upon the billing zone location of RT 102. This feature is described below in connection with DISP process 600.

RT 102 also includes a transmitter 310 connected to control circuit 304. Transmitter 310 transmits an access message to cordless base station 114 when RT 102 is within the cordless operating range. This feature is described below in connection with ACK process 700. Preferably, transmitter 310 is the same transmitter used by RT 102 for other control and voice communications. Furthermore, transmitter 310 and receiver 302 may be integrated into one transceiver assembly.

With reference again to FIG. 1, the billing zone display and cordless base registration features of CTS 100 will be described. For the sake of clarity and simplicity, cells 108 are shown divided into a first zone 120 and a second zone 122. For purposes of this description, first zone 120 corresponds to a local billing rate zone and second zone 122 corresponds to a premium billing rate zone. In addition, first zone 120 and second zone 122 also correspond to a first local region and a second local region, respectively. Although the actual configuration of zones and local regions may vary (see FIG. 2), FIG. 1 depicts two zones overlapping two local regions.

Figure 8:
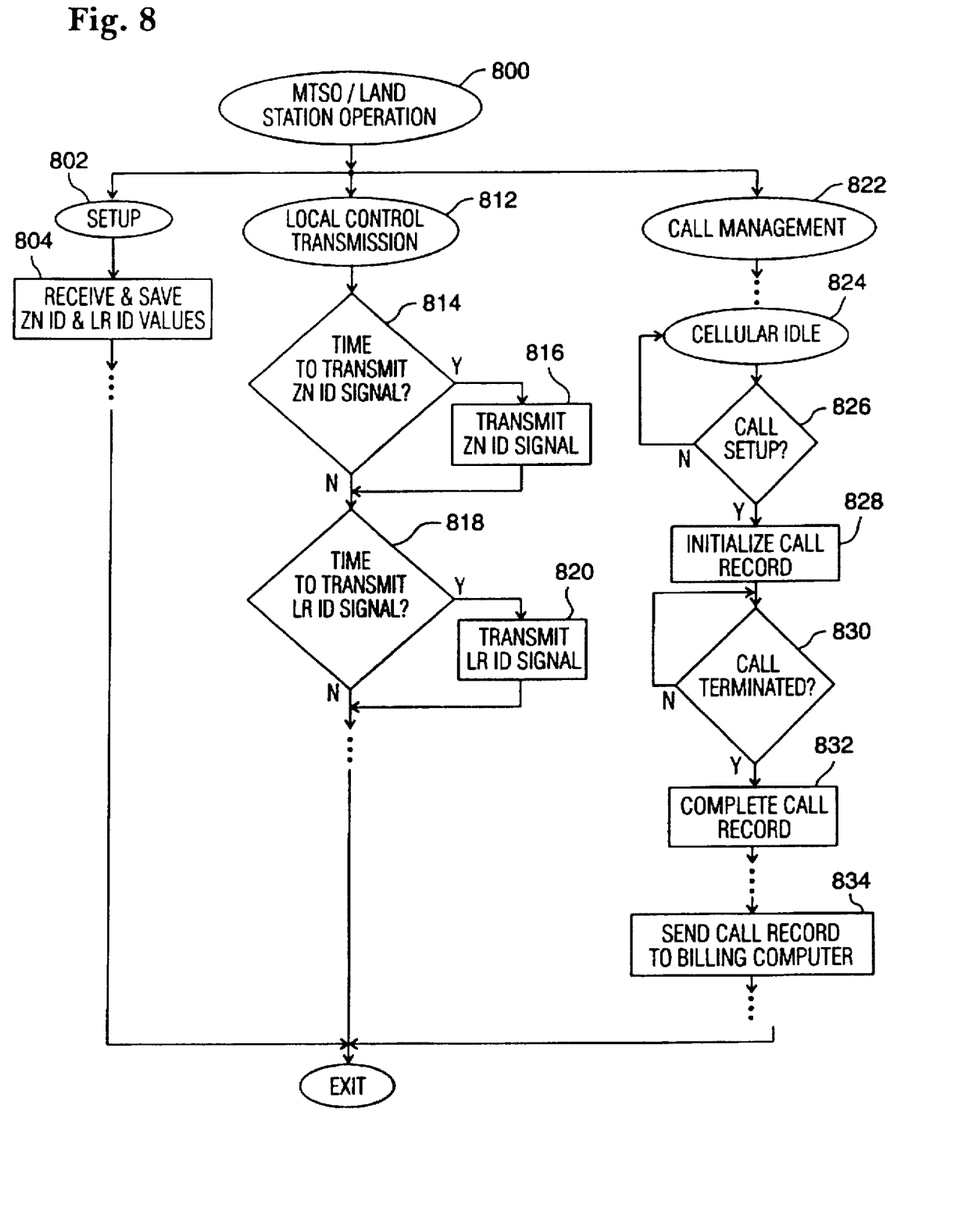
FIG. 8 is a flow diagram of several operating processes that are performed by CTS components.

As a preliminary step, CTS 100 is geographically divided into the zones and local regions. A system operator provides MTSO 104 or land stations 106 with the ZNID and LRID signal values relating to the geographic location of the corresponding cells 108. These signal values will be transmitted by land stations 106 throughout the corresponding cells 108. Programming unit 112 may be provided to communicate initial or updated ZNID and LRID signal values to each land station 106. This MTSO or land station procedure is depicted in FIG. 8 as a setup process 802. Setup process 802 includes a task 804 that receives and saves the ZNID and LRID signal values at MTSO 104 or land stations 106. Following task 804, setup process 802 exits. Of course, other preliminary MTSO or land station setup processes may be performed along with setup process 802.

Programming unit 112 may also be provided for the programming of RT 102. Although FIG. 1 shows programming unit 112 connected to MTSO 104, programming unit 112 may alternatively be located at MTSO 104, land stations 106, or some other location within CTS 100. According to one aspect of the present invention, programming unit 112 is utilized to provide RT 102 with initial and updated ZNID and LRID codes.

Figure 4:
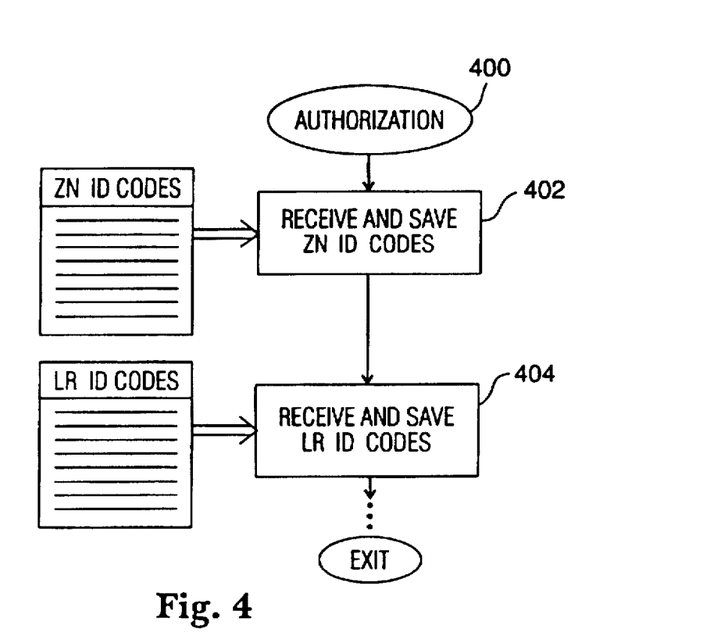
FIG. 4 is a flow diagram of an authorization process that is performed by a CTS.

With reference now to FIG. 4, an authorization process 400 is illustrated as a flow diagram. Authorization process 400 is performed by RT 102 to store the ZNID and LRID codes into memory at data storage element 306. Authorization process 400 first performs a task 402, which receives and saves the ZNID codes. Following task 402, a task 404 receives and saves the LRID codes. Tasks 402 and 404 may store up to eight ZNID codes and eight LRID codes, respectively, at RT 102. After task 404, authorization process 400 exits.

Authorization process 400 may be performed during the initial cellular registration process, or when the ZNID or LRID codes have been updated. Such updating may occur if a customer has changed his or her billing rate structure or if the billing zones within CTS 100 are changed. Depending upon the specific CTS, authorization process 400 may be performed remotely, i.e., RT 102 may be programmed without a system operator actually handling it. In addition to storing the ZNID and LRID codes, authorization process 400 may also be utilized to store other operating parameters at RT 102. Furthermore, authorization process 400 may not always be necessary to store the ZNID and LRID codes, i.e., RT 102 may be pre-programmed with initial ZNID or LRID codes.

Referring again to FIG. 1, each land station 106 periodically transmits an assigned ZNID signal and an assigned LRID signal throughout its corresponding cell 108. In CTS 100 depicted in FIG. 1, land stations 106a and 106b will transmit one ZNID signal while land stations 106c and 106d will transmit a different ZNID signal. Similarly, land stations 106a and 106b will transmit a different LRID signal than land stations 106c and 106d.

Figure 6:
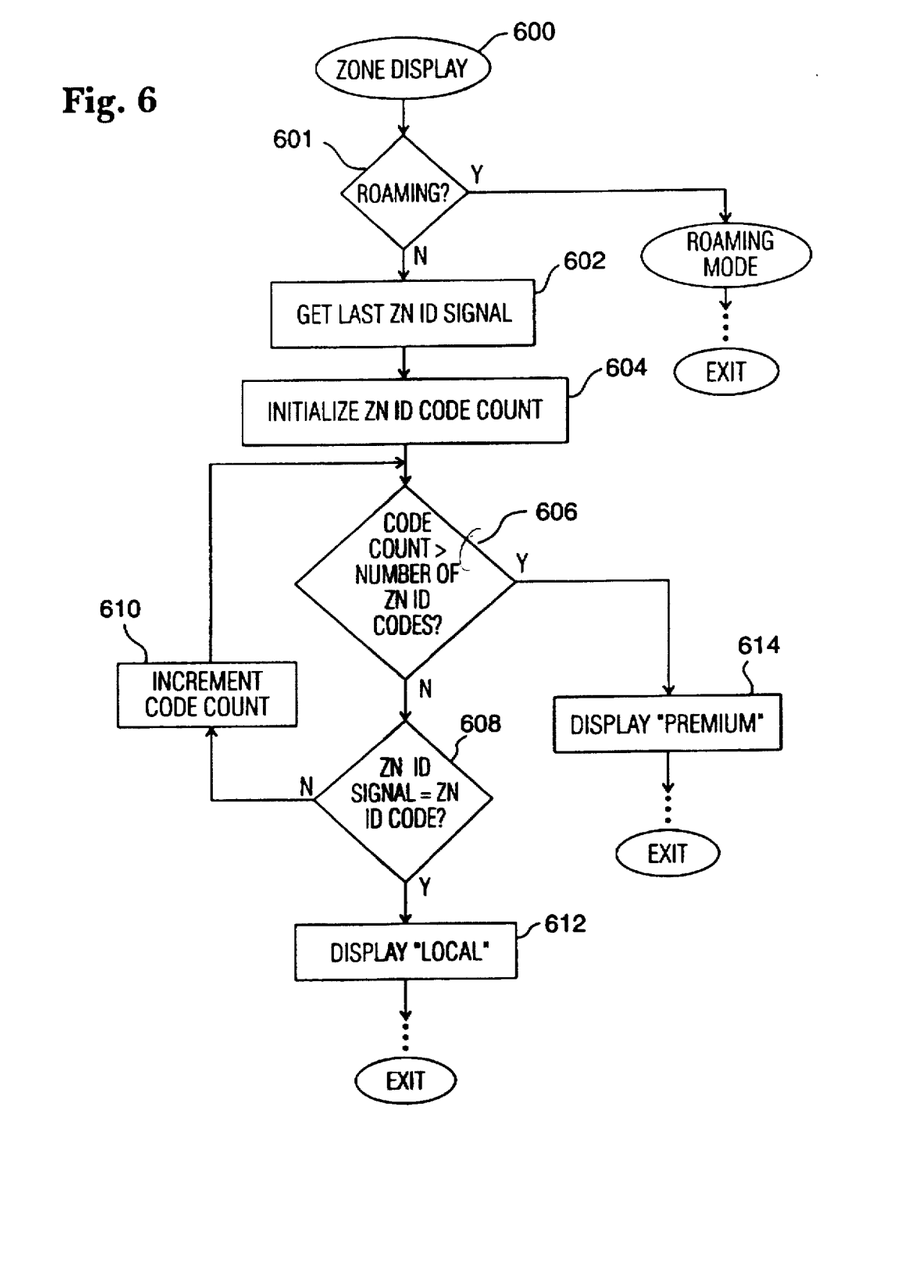
FIG. 6 is a flow diagram of a zone location display process that is executed by an RT.
Figure 7:
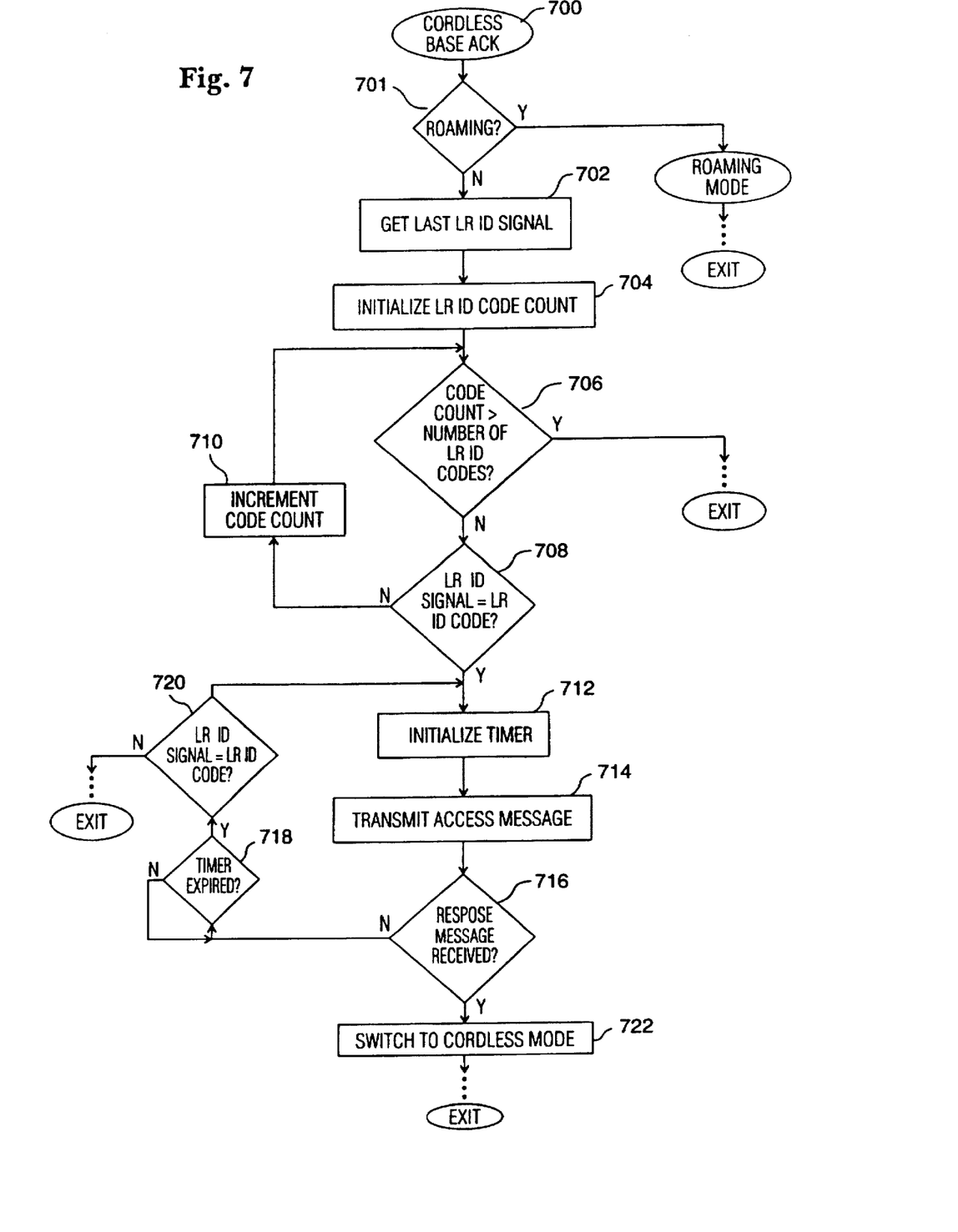
FIG. 7 is a flow diagram of a cordless base acknowledge process that is executed by an RT.

Preferably, CTS 100 and RT 102 are compatible with the operating requirements set forth in EIA/TIA Standard 553. According to the preferred embodiment, the ZNID and LRID signals are transmitted as part of an overhead local control message as described in EIA/TIA Standard 553. The overhead local control message contains a 16-bit local control field that is utilized by the present invention for the transmission of the ZNID and LRID signals. The local control field is encoded with the zone identity or local region identity associated with the geographic area that the transmitting land station covers. Those familiar with cellular systems and technology will appreciate that transmitting the ZNID and LRID signals in this manner results in DISP process 600 and ACK process 700 (described below) being independent of the cellular operating frequencies. Thus, if the operating frequencies are altered, the ZNID and LRID signals may remain unchanged in the local control message.

With reference again to FIG. 8, a local control transmission process 812 performed by land stations 106 is illustrated as a flow chart. Local control transmission process 812 begins with a query task 814. Query task 814 determines whether it is time for land station 106 to transmit a ZNID signal. If so, then a task 816 causes land station 106 to transmit a ZNID signal before proceeding to a query task 818. If query task 814 determines that it is not time to transmit a ZNID signal, then task 816 is bypassed and query task 818 is initiated. Query task 818 determines whether it is time for land station 106 to transmit an LRID signal. If so, then a task 820 causes land station 106 to transmit an LRID signal. Following task 820, local control process 812 exits. If query task 818 determines that it is not time to transmit an LRID signal, then task 820 is bypassed and local control transmission process 812 exits. Although local control process 812 is shown to exit, those skilled in this art will realize that it may be performed along with other control or communication processes. In addition, the ZNID and LRID signals are each transmitted by land station 106 at a preferred rate between one transmission every few seconds to one transmission every minute to ensure that any authorized RT can receive the ZNID and LRID signals promptly.

Figure 5:
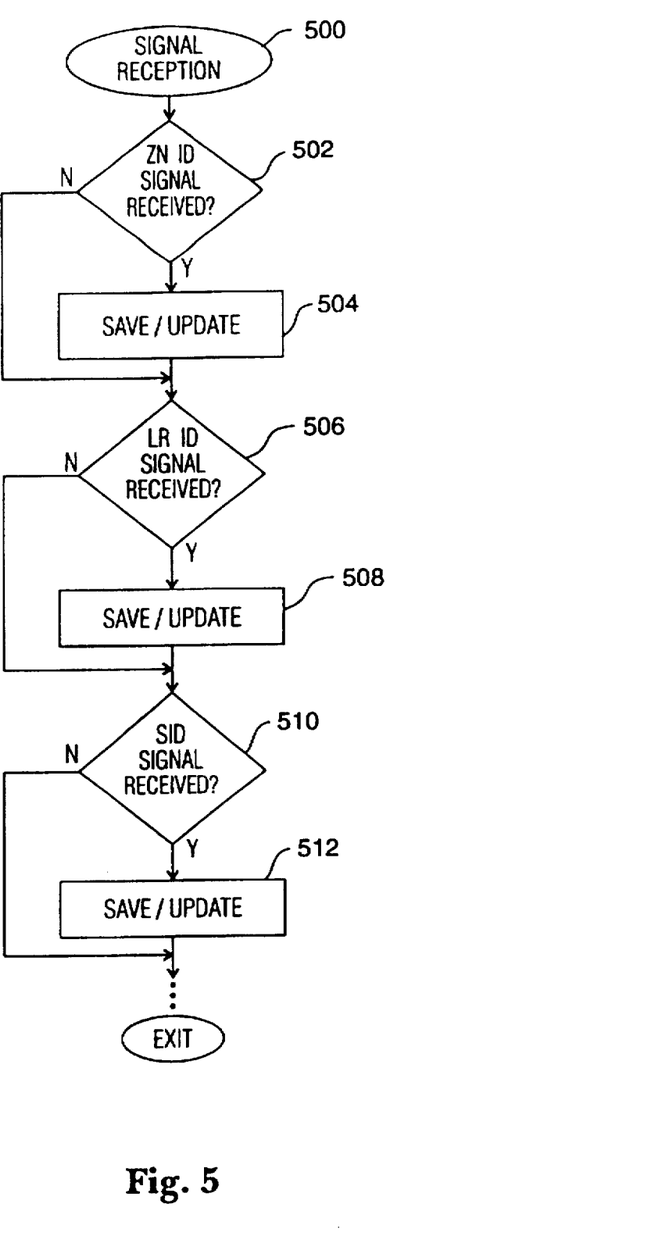
FIG. 5 is a flow diagram of a signal reception process that is executed by an RT.

Referring now to FIGS. 5 and 1, a signal reception process 500 will be described. Preferably, signal reception process 500 is performed by RT 102 at least while it is in the cellular mode. Signal reception process 500 may be performed while RT 102 is in cellular idle or while a call is in progress.

Signal reception process 500 begins with a query task 502. Query task 502 tests whether a ZNID signal was received at RT 102. If query task 502 determines that a ZNID signal was received, then a task 504 saves the ZNID signal in memory and proceeds to a query task 506. If query task 502 determines that a ZNID signal was not received, then task 504 is bypassed and query task 506 is initiated. Query task 506 tests whether an LRID signal was received at RT 102. If so, then a task 508 saves the LRID signal in memory. If query task 506 determines that an LRID signal was not received, then task 508 is bypassed. Following task 508, a query task 510 tests whether a SID signal was received at RT 102. If so, then a task 512 saves the SID signal into memory. If query task 510 determines that a SID signal was not received, then task 512 is bypassed and signal reception process 500 exits.

Although signal reception process 500 is shown to exit after task 512, it may repeat as needed when signals are received to ensure that the ZNID, LRID, and SID signal values are frequently updated. Additionally, signal reception process 500 may be incorporated into another process that includes the reception of other control or communication messages. The ZNID and LRID signals stored at tasks 504 and 508, respectively, are utilized by RT 102 in DISP process 600 and ACK process 700 (described below).

FIG. 6 shows a flowchart of DISP process 600 performed by RT 102, and FIG. 7 shows a flowchart of ACK process 700 performed by RT 102. DISP process 600 and ACK process 700 are both intrasystem location dependent operations, i.e., the intrasystem location of RT 102 determines the functional result of the processes. Preferably, DISP process 600 and ACK process 700 are performed by RT 102 at least while it is in the cellular mode. Like signal reception process 500, DISP process 600 and ACK process 700 may be performed during cellular idle or while a call is in progress. Generally, DISP process 600 compares the ZNID signal received during signal reception process 500 to one or more ZNID codes stored at RT 102, while ACK process 700 compares the LRID signal received during signal reception process 500 to one or more LRID codes stored at RT 102.

According to one aspect of the present invention, DISP process 600 is utilized to display a billing rate indicator at RT 102 in response to the received ZNID signal. With specific reference to FIG. 6, DISP process 600 will be described in detail. As a preliminary step, a query task 601 determines whether RT 102 is outside of the operating boundary of CTS 100. Query task 601 compares the SID stored at RT 102 in task 512 with the SID of CTS 100. If query task 601 determines that RT 102 is outside the boundary of CTS 100, then RT 102 is switched to roaming mode. While roaming, RT 102 may activate a "ROAM" display or other mode indicator. In addition, RT 102 may perform other operations related to roaming. After RT 102 is switched to roaming mode, DISP process 600 exits. If query task 601 determines that RT 102 is not roaming, then a task 602 is prompted.

Task 602 acquires the last ZNID signal that was stored at RT 102 in task 504. Following task 602, a task 604 initializes an internal ZNID code counter and exits to a query task 606. As described above, RT 102 may store up to eight ZNID codes in data storage element 306. This gives the system operators flexibility when designating zones for individual subscribers. Query task 606 tests whether the current counter value exceeds the number of memorized ZNID codes. If query task 606 determines that the current counter value does not exceed the number of memorized ZNID codes, then a query task 608 is initiated.

Query task 608 compares the retrieved ZNID signal with the ZNID code corresponding to the current counter value. If the received ZNID signal does not match the current ZNID code, then a task 610 increments the ZNID code counter before query task 606 is reentered. As shown, tasks 606, 608, and 610 create a processing loop that compares the ZNID signal with each of the ZNID codes stored at RT 102. If query task 608 determines that the ZNID signal matches one of the stored ZNID codes, then a task 612 is prompted. If all of the stored ZNID codes have been analyzed without a match, then query task 606 will determine that the current counter value exceeds the number of ZNID codes stored in the memory. When this occurs, query task 606 prompts a task 614.

Task 612 is prompted if query task 608 determines that the received ZNID signal matches one of the stored ZNID codes. Task 612 causes a first zone indicator to be displayed at RT 102. Task 614 is prompted if the received ZNID signal does not match any of the stored ZNID codes. Task 614 causes a second zone indicator to be displayed at RT 102.

According to one aspect of the present invention, the first and second zone indicators correspond to first and second zones having local and premium billing rates, respectively. As such, task 612 causes "LOCAL" to be displayed at RT 102 and task 614 causes "PREMIUM" to be displayed at RT 102. Those skilled in the art will appreciate that the number of zones and displayed indicators may vary according to specific system requirements. Furthermore, the intrasystem zone location information may also be processed according to specific needs, and the present invention is not limited to billing zones and billing rate indication.

After task 612 or task 614 causes the first zone indicator or second zone indicator, respectively, to be displayed at RT 102, DISP process 600 exits. Those skilled in the cellular telephony art will appreciate that DISP process 600 may exit into a cellular idle mode, or periodically repeat itself to update the current display. Additionally, DISP process 600 may begin whenever RT 102 is powered up into the standby mode. Due to the inherent mobility of CTS handsets, DISP process 600 continually updates the intrasystem billing zone location status of RT 102, which informs the user and allows him or her to make calling decisions based upon current billing rate information.

According to another aspect of the present invention, ACK process 700 is performed by RT 102 to determine whether it is to operate in cellular or cordless mode. If the received LRID signal matches one of the stored LRID codes, then RT 102 attempts to establish a communication link with cordless base station 114. With specific reference to FIG. 7, ACK process 700 will be described in detail.

Tasks 701–710 are similar to tasks 601–610, respectively. However, ACK process 700 substitutes LRID signals and codes for ZNID signals and codes. Accordingly, the above description of tasks 601–610 also applies to tasks 701–710 of ACK process 700. In particular, a query task 701 determines whether RT 102 is outside the operating boundary of CTS 100. If so, then RT 102 is switched into roaming mode and ACK process 700 exits. If RT 102 is not outside the boundary of CTS 100, then a task 702 acquires the last LRID signal that was stored at RT 102 in task 508. A task 704 initializes an internal LRID code counter and exits to a query task 706. Query task 706, a query task 708, and a task 710 form a processing loop to determine whether the received LRID signal matches one of the stored LRID codes. If there is a match, then a task 712 is prompted. If all of the stored LRID codes have been analyzed without a match, then query task 706 causes ACK process 700 to exit.

If ACK process 700 exits from query task 706, then RT 102 may, for example, reenter task 702 after a predetermined amount of time to retrieve the current LRID signal, switch to cellular mode, or remain idle until a different LRID signal is received. In addition, even if query task 708 determines that the ARID signal matches one of the LRID codes, tasks 701–710 may periodically repeat to monitor the current location of RT 102.

As stated above, task 712 is initiated if the received LRID signal matches one of the stored LRID codes. Task 712 initializes an internal timer at RT 102. Task 712 leads to a task 714, which causes RT 102 to transmit an access message to cordless base station 114. According to the preferred embodiment, the access message is transmitted on a cordless operating frequency. This frequency restriction prevents interference between the cellular control and communication channels and the cordless control and communication channels.

Cordless base station 114 determines whether an access message was received at cordless base station 114. Due to the limited transmit/receive range of cordless base station 114, an access message will only be detected if RT 102 is close to cordless base station 114. If no access message was received at cordless base station 114, then RT 102 may subsequently switch to cellular mode. If an access message was received at cordless base station 114, then cordless base station 114 transmits a response message to RT 102. The response message is also transmitted over a cordless operating frequency assigned to cordless base station 114.

Following task 714, RT 102 performs a query task 716. Query task 716 tests whether a response message from cordless base station 114 was received at RT 102. If query task 716 determines that a response message was received, then ACK process 700 proceeds to a task 722, which switches RT 102 into cordless mode. Following task 722, ACK process 700 exits.

If query task 716 determines that no response message was received from cordless base station 114, then a query task 718 tests whether the internal timer has expired. If query task 718 finds that the internal timer has not expired, then task 718 is reentered. Thus, task 718 repeats itself until the internal timer has elapsed, but nothing prevents RT102 from performing other processes while waiting at task 718. The internal timer is utilized so that RT 102 will retransmit the access message approximately every four minutes. This feature conserves operating channel usage and reduces the possibility of interference. With brief reference again to FIG. 1, an RT located outside of cordless boundary 118 will only transmit the access message about once every four minutes. However, an RT within cordless boundary 118 is likely to receive a response message within the allotted time.

If task 718 determines that the internal timer has expired, then a query task 720 tests whether the current LRID signal still matches one of the stored LRID codes. If not, then RT 102 is no longer within the local region encompassing cordless base station 114, and ACK process 700 exits at query task 720. Of course, ACK process 700 may be reentered at task 701 or RT 102 may switch to cellular idle mode if ACK process 700 exits at query task 720. If query task 720 determines that the current LRID signal matches one of the LRID codes, then task 712 is reentered.

According to another aspect of the present invention, ZNID process 600 and ACK process 700 may be performed at RT 102 simultaneously and with other conventional operating processes. With the two processes combined, RT 102 can be operated in a preferred manner that includes intrasystem billing zone display and dual-mode operation.

With reference again to FIG. 8, a call management process 822 for a single call is illustrated as a flow chart. Call management process 822 is performed by MTSO 104 to manage a call with RT 102 when RT 102 is used in cellular mode. MTSO 104 assumes a standard cellular idle mode 824 while waiting for a call setup at RT 102. Furthermore, call management process 822 utilizes conventional cellular operating processes for data transmission.

Call management process 822 begins with a query task 826 that determines whether a call setup process is underway for RT 102. If query task 826 detects a call setup, then a task 828 is initiated. Otherwise, RT 102 returns to cellular idle mode 824. Thus, task 828 is not performed until a call setup is detected.

Task 828 initializes a call record at MTSO 104 in response to a call setup. The call record may include system data such as the mobile identification number (MIN) assigned to RT 102, the SID of CTS 100, the MTSO identification, a time stamp, and the cell identification. Following task 828, a query task 830 tests whether the call has been terminated. If the call has been terminated, then a task 832 is initiated. If query task 830 determines that the call is still in progress, then query task 830 is repeated until the call is terminated.

Task 832 completes the call record that was initialized at task 828. Task 832 may record data such as a final time stamp. After task 832, a task 834 eventually sends the call record to billing computer 110. As described briefly above, MTSO 104 may include or be in data communication with billing computer 110, which records and processes calling data. The ellipses before task 834 indicate that task 834 may occur at a later time, i.e., after many individual call records have been completed. In addition, task 834 may send combined call records associated with many different users of CTS 100. Following task 834, call management process 822 exits. Those skilled in the art will realize that call management process 822, local control transmission process 812, and setup process 802 may occur along with other conventional operating processes at MTSO 104 or land stations 106. In addition, call management process 822 may be simultaneously performed to handle any number of simultaneous calls with any number of RTs.

Figure 9:
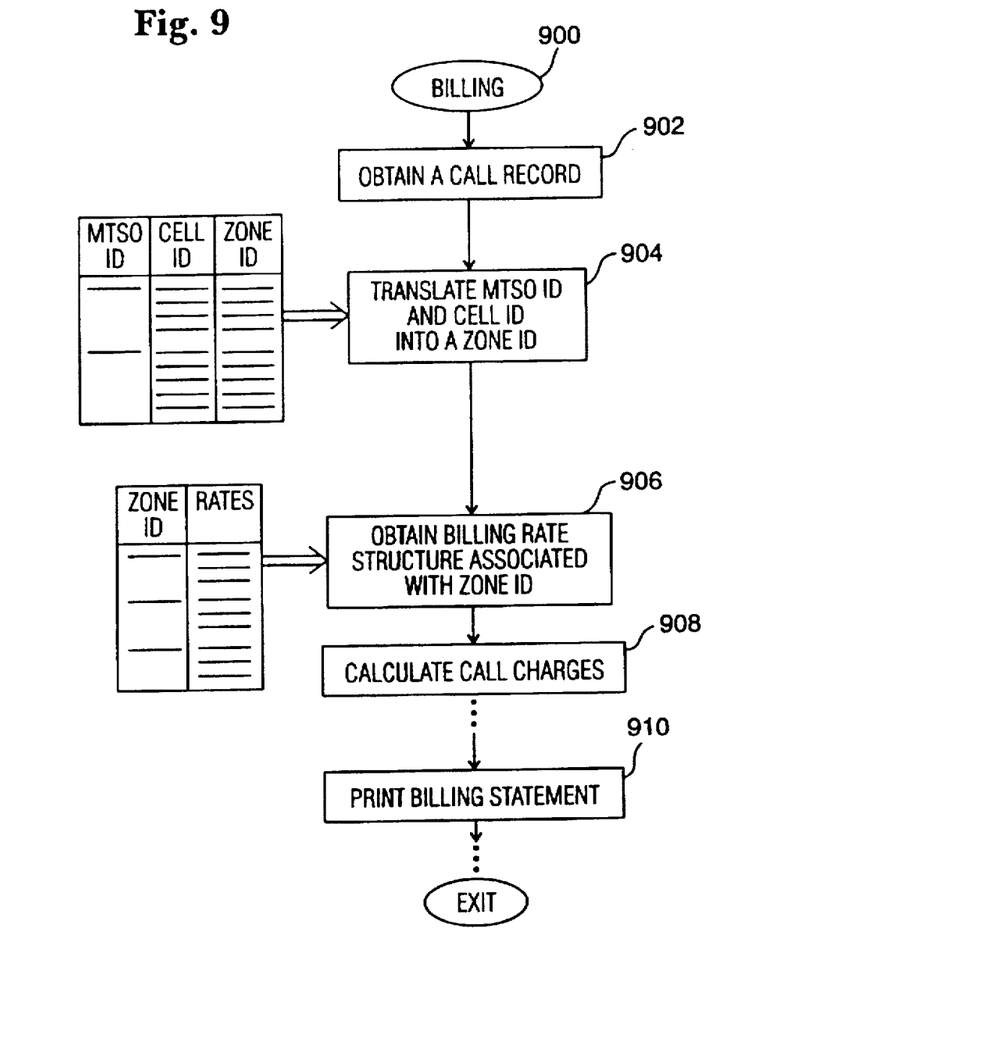
FIG. 9 is a flow diagram of a billing process that is performed by a billing computer.

With reference now to FIG. 9, a billing process 900 performed by billing computer 110 is depicted as a flow diagram. Billing process 900 begins with a task 902 that obtains a call record generated by call management process 822. As discussed above, task 834 periodically sends call records to billing computer 110. After task 902 obtains the call record, a task 904 is initiated.

Task 904 translates the MTSO identity and the cell identity (obtained during call management process 822) into a zone identity. The combination of the MTSO identity and the cell identity provides a unique zone identity corresponding to billing zones within CTS 100. Following task 904, a task 906 is prompted.

Task 906 obtains the billing rate structure associated with the unique zone identity determined in task 904. Thus, system operators can establish and alter the billing rate structures on a zone-by-zone basis. After task 906, a task 908 calculates the charges for the call described by the call record. During task 908, billing computer 110 utilizes the call record information and the billing rate structure to calculate the call charges. Following task 908, a task 910 is eventually initiated. However, nothing prevents tasks 902, 904, 906, and 908 from being repeated (not shown) for other individual call records.

Task 910 causes billing computer 110 to print out a billing statement that summarizes call activity for each individual user of CTS 100. In addition to the various call charges, task 910 may also include data obtained during call management process 822 such as the MIN, the time stamps, or the cell identification. As described above in relation to task 834, the ellipses before task 910 indicate that task 910 may occur at a later time, i.e., after many individual call records have been completed. In addition, task 910 may operate on multiple call records for a single subscriber and may occur in combination with other conventional billing processes well known in the art. Following task 910, billing process 900 exits.

In summary, the present invention provides an improved method of operating an RT within a CTS having a unique SID. In addition, an RT is provided that identifies its location within a CTS having a unique SID. The present invention also provides a CTS that identifies and processes the intrasystem location of an RT operating within the system.

Furthermore, an improved RT and method of initiating the cordless operation of the RT within a dual-mode telecommunication system is provided.

The above description is of a preferred embodiment of the present invention, and the invention is not limited to the specific embodiment described and illustrated. For example, although the Figures and the above description have been directed towards an embodiment having only one RT, those skilled in the art will appreciate that a useful telecommunications system must support many RTs corresponding to a number of users. As such, there may be a multitude of cordless base stations located within a single cell boundary. As another example, the zones and local regions may be variably assigned, resulting in a vast amount of overlapping zone and local region patterns. Furthermore, many other variations and modifications will be evident to those skilled in this art, and such variations and modifications are intended to be included within the spirit and scope of the invention, as expressed in the following claims.

What is claimed is:

1. A method of operating a radiotelephone (RT) within a cellular telecommunication system (CTS) having a unique system identification (SID), a plurality of land stations configured to communicate with said RT, a plurality of cells defining the transmit/receive range of said land stations, a plurality of local regions defined by the area associated with one or more of said cells, and a cordless base station configured to communicate with said RT, said method comprising the steps of:

receiving an intrasystem local region identification signal at said RT, said intrasystem local region identification signal being transmitted by one of said land stations;

comparing said received intrasystem local region identification signal with one or more local region identification codes at said RT; and initiating communication between said RT and said cordless base station in response to said comparing step when said received intrasystem local region identification signal matches one of said local region identification codes.

2. A method according to claim 1, wherein said comparing step occurs before said initiating step.

3. A method according to claim 1, wherein said CTS is compatible with EIA/TIA Standard 553, and wherein said intrasystem local region identification signal is part of a local control message.

4. A method according to claim 1, wherein said CTS additionally includes a plurality of zones defined by the area associated with one or more of said cells, said zones differing from said local regions, and said method further comprises the steps of:

receiving a zone identification signal transmitted by one of said land stations;

comparing said received zone identification signal with one or more zone identification codes at said RT; and displaying either a first zone indicator or a second zone indicator at said RT in response to said comparing step.

5. A method according to claim 4, further comprising the step of storing said one or more zone identification codes at said RT, said storing step occurring before said zone identification signal receiving step.

6. A method according to claim 1, wherein said initiating step comprises transmitting an access message from said RT to said cordless base station.

7. A method according to claim 6, wherein said transmitting step is periodically repeated until said RT receives a response from said cordless base station.

8. A method according to claim 1, further comprising the step of storing said one or more local region identification codes at said RT, said storing step occurring before said receiving step.

9. A radiotelephone (RT) for operation within a cellular telecommunication system (CTS) having a unique system identification (SID), a plurality of land stations configured to communicate with said RT, a plurality of cells defining the transmit/receive range of said land stations, a plurality of local regions defined by the area associated with one or more of said cells, and a cordless base station configured to communicate with said RT, said RT comprising:

a receiver for receiving an intrasystem local region identification signal, said intrasystem local region identification signal being transmitted by one of said land stations;

a data storage element for storing one or more local region identification codes; and a control circuit having means for comparing said received intrasystem local region identification signal with said one or more local region identification codes, said control circuit being connected to said receiver and to said data storage element; and a transmitter for initiating communication between said RT and said cordless base station in response to said control circuit when said received intrasystem local region identification signal matches one of said local region identification codes.

10. An RT according to claim 9, wherein:

said CTS additionally includes a plurality of zones defined by the area associated with one or more of said cells, said zones differing from said local regions;

said receiver additionally receives a zone identification signal transmitted by one of said land stations;

said data storage element additionally stores one or more zone identification codes;

said control circuit additionally compares said received zone identification signal with said one or more zone identification codes; and said RT further comprises:

a display element connected to said control circuit;

a first zone indicator integral to said display element; and a second zone indicator integral to said display element;

wherein said control circuit causes either said first zone indicator to be displayed at said display element when said RT is operated in a first zone or said second zone indicator to be displayed at said display element when said RT is operated in a second zone.

* * * * *